Oct. 8, 1963 R. C. CARTER 3,106,646

VARIABLE THRESHOLD SENSING CIRCUIT

Filed June 18, 1959 3 Sheets-Sheet 1

INVENTOR.
ROBERT C. CARTER
BY Marvin Moody
ATTORNEY

Oct. 8, 1963 R. C. CARTER 3,106,646

VARIABLE THRESHOLD SENSING CIRCUIT

Filed June 18, 1959 3 Sheets-Sheet 2

INVENTOR.
ROBERT C. CARTER
BY Mari Moody
ATTORNEY

Oct. 8, 1963 R. C. CARTER 3,106,646

VARIABLE THRESHOLD SENSING CIRCUIT

Filed June 18, 1959 3 Sheets-Sheet 3

INVENTOR.
ROBERT C. CARTER
BY
ATTORNEY

United States Patent Office 3,106,646

Patented Oct. 8, 1963

3,106,646

VARIABLE THRESHOLD SENSING CIRCUIT

Robert C. Carter, Richardson, Tex., assignor to Collins Radio Company, Cedar Rapids, Iowa, a corporation of Iowa Filed June 18, 1959, Ser. No. 821,285
1 Claim. (Cl. 307—88.5)

This invention relates generally to a switching circuit that possesses a variable threshold sensing characteristic such that the magnitude of voltage required to switch the circuit may be varied without affecting the output characteristics of the circuit.

In squelch or voice operated relay (VOX) circuits and the like, it often becomes necessary to vary the operating threshold of the trigger voltage. However, a variation of the threshold voltage will generally cause a voltage variation of the two stable states in the output. A variation in the two stable states of the output may affect the operation of following circuitry, such as a relay, or diode switch.

It oftentimes becomes desirable to vary the threshold condition of the squelch or VOX circuits especially when the signal-to-noise ratio from the RF portion of the receiver is varied. For example, during an electrical disturbance such as a thunderstorm, or when a plurality of stations are on the same frequency, it would normally be necessary to have a high threshold voltage level so that only the strongest signals will operate the squelch circuit. However, during low electrical activity or speech activity in the immediate vicinity on the same frequency, it would generally be desirable to have a low threshold voltage level thereby providing communication reception at a maximum distance.

It is, therefore, an object of this invention to provide a switching circuit which has a variable threshold characteristic.

It is another object of this invention to provide a circuit wherein the output voltage can be shifted from one discrete voltage level to another discrete voltage level with a predetermined threshold point.

It is a further object of this invention to provide a circuit wherein one input can be switched to a plurality of outputs upon application of a predetermined amount of voltage to a second input.

It is still another object of this invention to provide a variable threshold at the input of a circuit without causing a corresponding variation in the output voltages of the two stable states.

This invention features first and second switching transistors having their emitters connected to the collector of a third transistor. An input is provided at the base of the third transistor. A switching voltage input is provided to the base of the first transistor and a reference voltage is provided to the base of the second transistor such that when the switching voltage is greater than the reference voltage, the first transistor becomes conductive, allowing the signal from the first input to be amplified by the conducting switching transistor and thence to the output. When the switching voltage is less than the reference input, the conducting transistor is rendered nonconductive and the other transistor is rendered conductive thereby removing the signal from the output. It is obvious that a second output could be placed on the remaining transistor thereby switching the signal from one output to the second output upon application of the switching voltage.

The circuit additionally features a feedback system which may be incorporated between the first switching transistor to the second switching transistor, thereby providing an infinitely steep voltage rise during the switching action. The invention also provides a means for varying the reference voltage which is applied as bias to the second switching transistor. Because of the connection of the transistors the previously mentioned reference voltage provides a means for varying the threshold characteristics of the circuit. Since the current through the load is not dependent upon the threshold reference voltage of the input circuit, a variation in the threshold will not cause a variation in the output current. Thus the output current is completely independent of the input threshold voltage level setting.

Further objects, features, and advantages of the invention will become apparent from the following description and claim when read in view of the accompanying drawings, in which:

Figure 1:
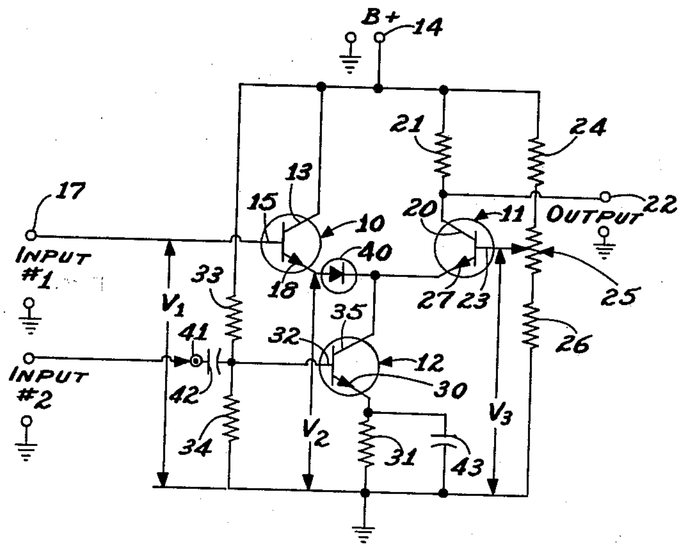
FIGURE 1 shows one embodiment of this invention.

Referring to FIGURE 1, the basic embodiment of this invention is shown which incorporates three transistors 10, 11 and 12. Transistor 10 is connected as a grounded collector amplifier wherein collector 13 is connected to a positive source of voltage 14. The base 15 is connected to a switching signal input 17. Transistor 11 is connected as a grounded base amplifier with its collector 20 connected to the source of positive voltage 14 through a load resistor 21. It is also connected to the output terminal 22. Bias for the base 23 of transistor 20 is provided by resistors 24, 25 and 26 serially connected between the positive voltage 14 and ground. Resistor 25 is a potentiometer with its arm 27 connected to base 23.

Transistor 12 is connected as a grounded emitter amplifier with its emitter 30 serially connected to ground through biasing resistor 31 and its base 32 connected to a biasing network comprising resistors 33 and 34 serially connected between the positive voltage source 14 and ground. The emitters 18 and 27 of transistors 10 and 11 respectively are connected to the collector 35 of transistor 12, a diode 40 being interposed between the transistor 18 and collector 35. A second input 41 is connected to the base 32 of transistor 12 through an isolation capacitor 42. A bypass capacitor 43 is connected in parallel with resistor 31. In operation assume $V_1$ is less than $V_2$. Under these conditions transistor 10 is in a state of cutoff. The current flowing through transistor 12 is adjusted to one milliampere by proper selection of the biasing resistors 31, 33, and 34. Transistor 12 is a grounded emitter connected transistor. Its operation is similar to that of a pentode tube, namely that a large variation in collector voltage will not vary the current through the collector.

The threshold of the circuit is set by potentiometer 25. Variation in the setting of this potentiometer causes a variation in the bias of transistor 11. Therefore, if the base voltage of transistor 11 is varied using potentiometer 25, the voltage on the emitter 27 follows the variation on base 23, i.e. an increase in voltage on the base causes increase in the voltage on the emitter. However, the collector current through transistor 11 is not dependent upon variations in voltage of the emitter or collector but rather is determined by the gain $\alpha_2$ of transistor 11, times the collector current $I_{c12}$ of transistor 12 or $$I_{c11}=(I_{c12}\alpha_{11})$$

$V_3$, therefore, can be varied without changing the output voltage at terminal 22, the output voltage being determined by the current $I_{c12}\cdot\alpha_{11}$ multiplied by the resistance of resistor 21. If the input voltage $V_1$ is now raised above $V_3$, the emitter voltage $V_2$ will start following the base voltage of transistor 10 or $V_1$. This cuts off transistor 11 and turns on transistor 10.

Figure 2:
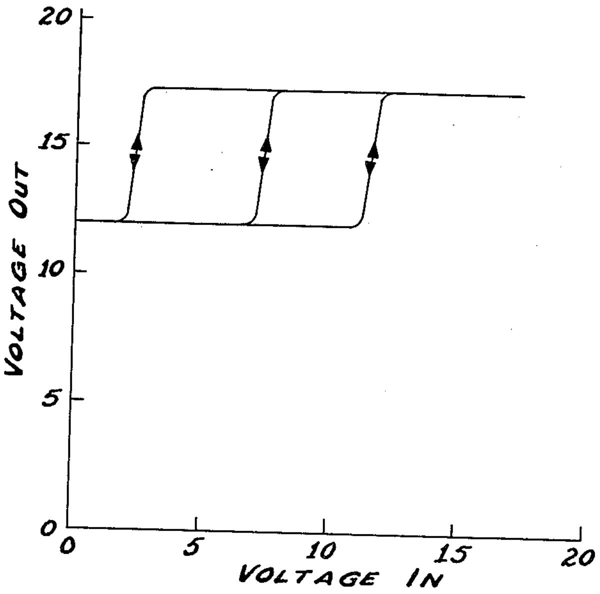
FIGURE 2 shows the input versus output voltage of FIGURE 1.

FIGURE 2 depicts a plot of the transfer characteristics of the circuit of FIGURE 1. As the circuit is switching the slope is finite and positive. An audio signal may be applied to the terminal 41. A switching signal is applied to terminal 17; thus the circuit may be used as a switch. During conduction of transistor 11 the audio signal is transferred through transistor 12, to the emitter of transistor 11, to the collector of transistor 11, and hence to the output terminal 22. When switching voltage is applied to terminal 17 sufficient to cause transistor 10 to conduct, transistor 11 will be cut off, thus removing the audio signal from terminal 22.

It is likewise obvious that if a load resistor were applied to the collector 13 of transistor 10 that a second output could be obtained from the collector of transistor 10. Thus the audio signal applied to terminal 41 could be switched from collector 20 of transistor 11 to collector 13 of transistor 10.

Diode 40 serves no important function in the circuit except that it prevents loading transistor 12 when the emitter-to-base diode of transistor 10 breaks down. This happens for some types of transistor as $V_1$ falls several volts below $V_3$. Another diode could be added in series with the emitter output of transistor 11 which would then protect transistor 11 when $V_1$ would substantially exceed $V_3$.

In many instances the finite voltage gain, i.e., the finite change of output versus a small change in input at the threshold point, is undesirable. The controlling "switching" voltage may be a slowly varying voltage that may, at times, linger about the threshold point. This will cause the operating points of the switching transistors to vary randomly and may garble the speech. In order to reduce this effect, positive feedback is employed from collector 13 to base 25 via resistor 51.

Figure 3:
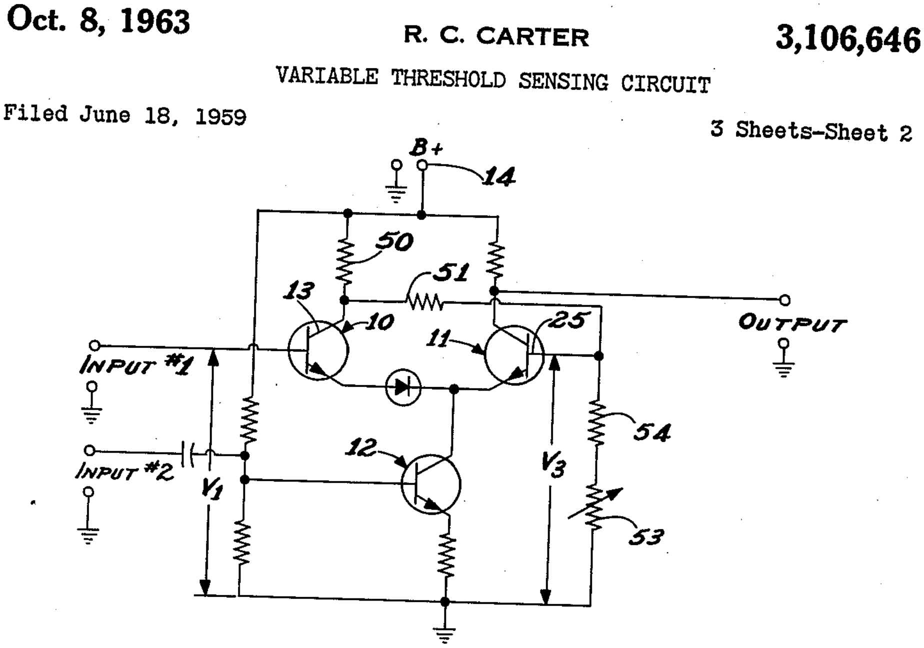
FIGURE 3 is a modification of FIGURE 1 incorporating feedback.

Referring to FIGURE 3, the variable threshold voltage, rather than being varied by potentiometer 25 as shown in FIGURE 1, is now varied by resistor 53. In the operation of this circuit, voltage from the base of transistor 11 is fed back to the collector 13 of transistor 10. This performs a trigger function which causes the slope to become infinite.

Figure 4:
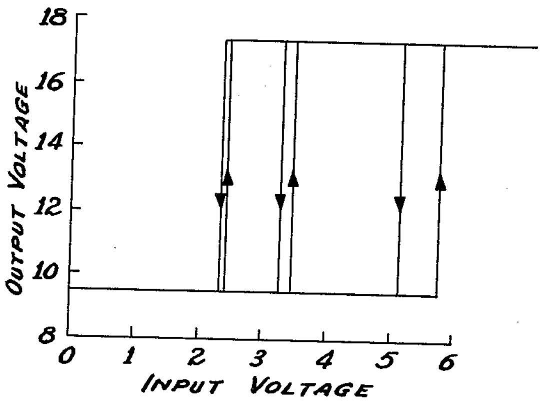
FIGURE 4 shows output voltage characteristics of the embodiment shown in FIGURE 3.

Referring to FIGURE 4 it is observed that the transfer characteristics vary with $V_3$. Since one resistor 53 in a feedback voltage divider network comprising resistors 53, 54, 51, and 50 is adjusted to vary the threshold voltage of the circuit, a variation in the amount of feedback from the base of transistor 11 to the collector 13 of transistor 10 will result. This variation in feedback voltage will cause a like variation in the transfer characteristics, as shown in FIGURE 4.

Figure 5:
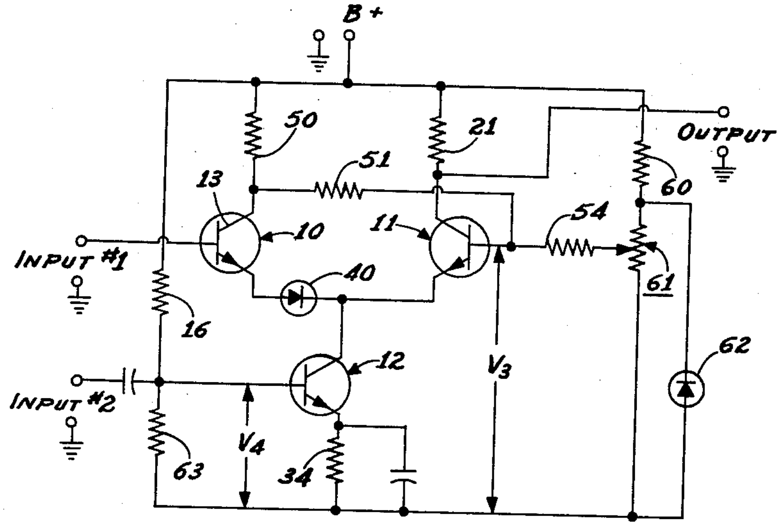
FIGURE 5 is another modification of the invention shown in FIGURE 1 providing for a more stable output.
Figure 6:
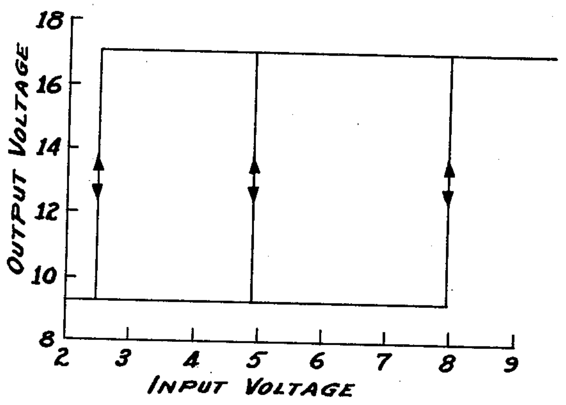
FIGURE 6 shows the characteristics of the output voltage of FIGURE 5.

FIGURE 5 shows a circuit which operates in the same manner as FIGURE 3. That is, resistors 50, 51, and 54 in cooperation with a voltage dividing network 60 and potentiometer 61 determine the feedback to the collector

13 of transistor 10. A zener diode 62 has been included to regulate the voltage between resistor 60 and potentiometer 61. Diode 62 reduces the change of alternating current impedance from the base of transistor 11 to ground. Thus if potentiometer 61 has a resistance of approximately 10,000 ohms and resistor 54 is 5,600 ohms and if the potentiometer were adjusted to either maximum or minimum, the resistance would be 5,600 ohms since the zener diode would effectively ground the A.C. across potentiometer 61 in the minimum position. At the middle of the potentiometer the maximum impedance would be 8,100 ohms.

It is obvious that in the circuits shown in FIGURES 1, 3 and 5 a resistor could be substituted for transistor 12. The emitters would still follow the highest voltage transistor 10 or transistor 11 but the current passing through either transistor 10 or transistor 11 would no longer be constant. This would of necessity cause the output voltage to vary with $V_3$.

A circuit has been constructed according to the teachings of this invention, where:

| | |
|---|---|
| Resistor **16** | 15,000 ohms. |
| Resistor **21** | 8,200 ohms. |
| Resistor **34** | 15,000 ohms. |
| Resistor **50** | 8,200 ohms. |
| Resistor **51** | 33,000 ohms. |
| Resistor **54** | 5,600 ohms. |
| Resistor **60** | 4,700 ohms. |
| Resistor **61** | 10,000 ohms potentiometer. |
| B+ | 18 volts D.C. |
| Transistors **10**, **11**, **12** | Type 905 manufactured by Texas Instruments Co. |
| Diode **40** | Germanium diode. |
| Diode **62** | 8 volt zener diode. |

While these values were chosen for this particular embodiment, the invention is not so limited as to preclude others within the intent and scope of the invention.

Thus a circuit has been disclosed which has a variable threshold characteristic wherein the output voltage can be shifted from one discrete voltage to another discrete voltage within either a predetermined voltage gain or an infinite voltage gain. Also, a circuit has been shown where an input can be switched to a plurality of outputs upon application of a predetermined amount of trigger voltage. In all cases a circuit has been shown wherein the output voltage level is not varied by a shift in the threshold characteristics of the input circuit. While NPN transistors have been shown, it is obvious that other transistors could be substituted upon proper selection of biases, etc.

Although this invention has been described with respect to a particular embodiment thereof, it is not to be so limited as changes and modifications may be made therein which are within the full intended scope of the invention as defined by the appended claim.

I claim:

A variable threshold sensing circuit comprising, first, second and third transistors each including at least a base, collector and emitter, a biasing means connected between a source of power and ground and connected to the base of said third transistor, means connecting the collector of said first and second transistors to said source of power, means connecting the emitters of said first and second transistors to the collector of said third transistor, a threshold varying means connected between said source of power and ground, said means including a potentiometer, means connecting the arm of said potentiometer to the base of said second transistor, feedback means including a resistor connecting the base of said second transistor to the collector of said first transistor, an output connected to the collector of said second transistor, whereby said feedback means causes the output voltage level to shift from one predetermined level to a second predetermined level with an infinite slope.

(References on following page)

References Cited in the file of this patent

UNITED STATES PATENTS

| | | |
|---|---|---|
| 2,641,717 | Toth | June 9, 1953 |
| 2,828,821 | Logue | Mar. 4, 1958 |
| 2,831,127 | Braicks | Apr. 15, 1958 |
| 2,840,699 | Carpenter | June 24, 1958 |
| 2,880,330 | Linvill | Mar. 31, 1959 |
| 2,888,527 | Follensbee et al. | May 26, 1959 |
| 2,888,578 | Bruce | May 26, 1959 |
| 2,898,479 | McElroy | Aug. 4, 1959 |
| 2,904,678 | Malchow | Sept. 15, 1959 |
| 2,926,241 | Goldman | Feb. 23, 1960 |
| 2,943,260 | Barnard | June 28, 1960 |
| 2,979,627 | Halpern | Apr. 11, 1961 |

FOREIGN PATENTS

| | | |
|---|---|---|
| 1,182,024 | France | June 22, 1959 |